United States Patent
Siraux

(10) Patent No.: US 8,106,136 B2
(45) Date of Patent: Jan. 31, 2012

(54) OPTIMISATION OF THE ETHYLENE POLYMERISATION PROCESS

(75) Inventor: Daniel Siraux, Naast (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/741,237

(22) PCT Filed: Nov. 5, 2008

(86) PCT No.: PCT/EP2008/065021
§ 371 (c)(1),
(2), (4) Date: Sep. 24, 2010

(87) PCT Pub. No.: WO2009/060008
PCT Pub. Date: May 14, 2009

(65) Prior Publication Data
US 2011/0021724 A1    Jan. 27, 2011

(30) Foreign Application Priority Data

Nov. 5, 2007 (EP) .................................. 07119993

(51) Int. Cl.
*C08F 2/12* (2006.01)
*B01J 19/18* (2006.01)
(52) U.S. Cl. ............................................. 526/64; 526/61
(58) Field of Classification Search .................... 526/61, 526/64
See application file for complete search history.

(56) References Cited

U.S. PATENT DOCUMENTS

| 6,465,586 B2 * | 10/2002 | McDaniel et al. ............. 526/129 |
| 2007/0037937 A1 * | 2/2007 | Damme .......................... 526/64 |

FOREIGN PATENT DOCUMENTS

| WO | WO 99/43724 | 9/1999 |
| WO | WO 2005/077994 | 8/2005 |

* cited by examiner

*Primary Examiner* — Fred M Teskin

(57) ABSTRACT

A method for ethylene slurry polymerisations in a loop reactor in the presence of ethylene monomer, diluent and catalyst and optionally co-monomer and hydrogen, wherein the polymerisation temperature is maintained below the swelling temperature, characterised in that the swelling temperature is calculated as a function of co-monomer concentration and the number average molecular weight of the polyethylene end-product.

9 Claims, 1 Drawing Sheet

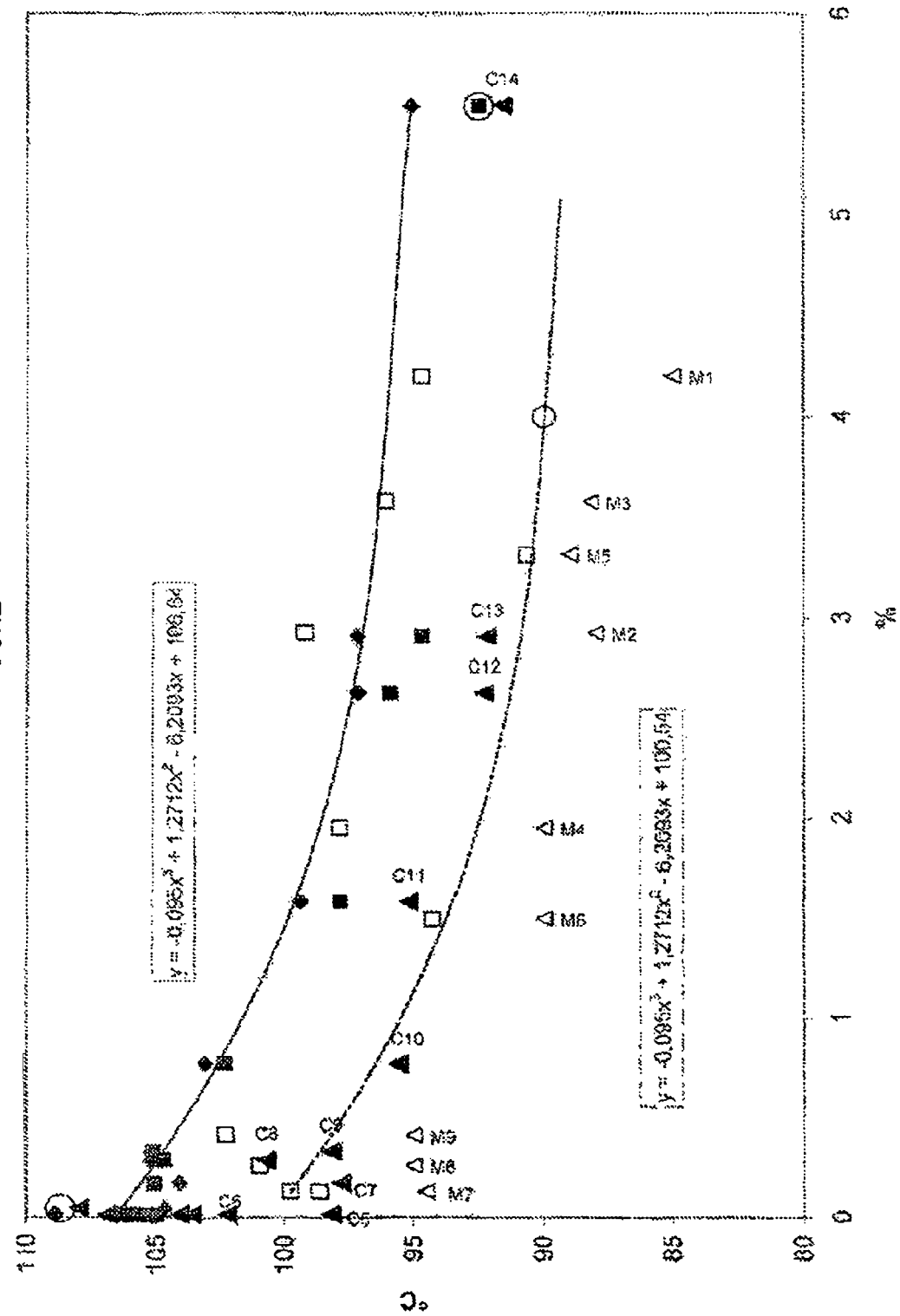
FIGURE

OPTIMISATION OF THE ETHYLENE POLYMERISATION PROCESS

CROSS-REFERENCE TO RELATED APPLICATIONS

This application claims the benefit of PCT/EP2008/065021, filed Nov. 5, 2008, which claims priority from EP07119993.9, filed Nov. 5, 2007.

FIELD OF THE INVENTION

The invention relates to chromium and metallocene catalysed ethylene slurry polymerisations.

BACKGROUND OF THE INVENTION

Polyethylene (PE) is synthesised via polymerising ethylene (CH2=CH2) monomers. Because PE is cheap, safe, stable to most environments and easily processed, polyethylene polymers are useful in many applications. According to its properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

It is known to produce polyethylene from ethylene monomer in the presence of diluent and catalyst and optionally one or more co-monomers and molecular weight regulators in a loop reactor. Usually the loop reactor is a liquid phase loop reactor wherein the components are circulated under pressure in slurry conditions. The product usually consists of solid particles and is in suspension in a diluent. The liquid diluent can be any hydrocarbon inert and liquid during ethylene polymerisation, for example alkanes, such as isobutane. The catalyst for producing polyethylene may typically comprise a chromium-based catalyst, a Ziegler-Natta catalyst or a metallocene catalyst. Molecular weight regulator is usually hydrogen, if added. A co-monomer can be any alpha-olefin with at least three carbons.

Continuous circulation of the slurry contents of the reactor is maintained with a pump, which also ensures efficient suspension of the polymer solid particles in the liquid diluent. Circulation is carried out at elevated polymerisation temperatures around the loop reactor, thereby producing polyethylene.

The product is discharged by means of settling legs, which operate on a batch principle to recover the product. Settling in the legs is used to increase the concentration of solids in the slurry to be recovered as product slurry. The product is further discharged to a flash tank, through flash lines, where most of the diluent and unreacted monomers are flashed off and recycled. The polymer particles are dried, additives can be added and finally the polymer is extruded and pelletised.

Alternatively, after discharging the product slurry from the settling legs, the reaction mixture may be fed to a second loop reactor serially connected to the first loop reactor where a second polyethylene fraction may be produced. Typically, when two reactors in series are employed in this manner, i.e. a first polyethylene fraction produced in a first reactor and a second polyethylene fraction produced in a second reactor, the resultant polyethylene product has a broad or bimodal molecular weight distribution.

Ethylene co-polymerisation is the process wherein ethylene is polymerised with co-monomer, i.e. an alpha-olefin, such as e.g. propylene, butene, hexene, etc. The lower the desired density of the final polyethylene, the higher the concentration of co-monomer in the reactor must be. A major problem in such co-polymerisation processes is that the control of reaction parameters is very difficult. In particular, the ratio of co-monomer to ethylene monomer differs at different points in the reactor. It is also becomes more difficult to control and optimise reaction conditions, such as reaction temperatures, when producing linear low-density polyethylene.

The operating temperature in the reactor has to be set as high as possible in order to have optimum conditions i.e. the higher the temperature in the reactor, the higher the productivity of the catalyst. However, increasing the temperature also increases the risk of swelling occurring in the reactor. Swelling is a phenomenon that occurs when diluent, e.g. isobutane, enters the polymer fluff and dissolves low molecular weight polymers. Comonomer, e.g. hexene, if present, is an even better solvent for low molecular weight polymers. Hence co-polymerisations suffer from a higher risk of swelling than homo-polymerisations. Swelling is also the result of the absorption of diluent and comonomer into the polymer grains. Consequently, the polymer slurry becomes more viscous, which perturbs the reactor flow and may even lead to blockage of the reactor. Therefore, temperature and slurry density must be well controlled in order to avoid the solubility of the lighter polymer fractions in the diluent. Solubility increases with increasing co-monomer concentration and with increasing temperature.

In chromium- and Ziegler-Natta-catalysed ethylene polymerisations, the onset of swelling can be detected by observing an increase in the power consumption of the circulation pump and also by an increase in the density of the slurry using the "x-ray sensor 3" (Rx) detector. As the reaction medium begins to become more viscose, the pump requires more power (kW) for circulating the slurry. The warning signal for swelling is thus an increase in the amplitude of the kW variation of the pump. When this is observed, the reaction medium can be quickly diluted with more diluent, e.g. isobutane, to return the slurry density to more optimal values. However, quick addition of diluent leads to a temporary loss in control over polymer properties, thereby resulting in non-homogeneous properties in the final polymer product.

Furthermore, these early warning signals are absent during metallocene-catalysed polymerisations. This is because metallocene-catalysed polyethylene has a much narrower molecular weight distribution (MWD). This means there is almost no tailing of low molecular weight compounds and far less which thus could dissolve into the diluent or comonomer and provide a warning signal for swelling. In addition metallocenes are single-site catalysts, which means that the growing polymer chains are always all roughly the same length. Furthermore, the weight average molecular weight (MW) of metallocene-catalysed polyethylene is usually smaller than the MW of chromium-catalysed polyethylene. Since the growing polymer chains are all shorter and all of similar length, once conditions are suitable, i.e. the temperature is high enough, almost all of the polymer will immediately dissolve into the reaction medium simultaneously. The slurry becomes more viscous and thus more difficult to circulate in the loop reactor. Immediate swelling may also lead to sudden blockage of the reactor.

In the past, the risk of swelling was decreased by setting the polymerisation temperature well below the temperature at which swelling is believed to pose a problem. Classically, this temperature has been predicted for chromium-catalysed polymerisations by calculating it from the linear relationship between the reaction temperature and the resin density i.e. the swelling curve. However, this swelling curve does not take into account the actual co-monomer concentrations in the reactor, nor does it take into account the molecular weight of the desired polyethylene. It also does not provide a method of incorporating MWD effects. Furthermore, these calculations are not applicable to metallocene-catalysed polymerisations. Metallocenes behave differently in response to co-monomer concentrations. To produce a resin of equivalent density, a metallocene-based resin requires a lower co-monomer concentration than a chromium-based resin, as it is much more efficient at co-monomer incorporation. The MWD of metallocene-produced resins are also much narrower.

The problem with using traditional swelling curves is that they do not allow the full potential of the catalyst to be exploited. Actual operating temperatures are usually far below the optimum temperatures, which can be utilised without the risk of swelling. As a result of the low reactor temperatures, the catalyst has limited productivity, the polymer has difficulties settling in the settling legs and co-monomer is not incorporated efficiently. Furthermore, especially chromium-catalysed polyethylenes show much lower melt potentials when polymerisation temperatures are too low.

The problem of swelling is particularly acute for metallocene-catalysed polymerisations due to the lack of warning signals.

In view hereof, there is a need in the art to provide a process for improving the polymerisation reaction of ethylene and in particular with α-olefin co-monomers, such that the co-polymerisation process is optimised and more homogeneous polymer end products are obtained.

It is therefore an aim of the invention to optimise the ethylene slurry polymerisation process.

It is also an aim to increase the polymerisation temperature during an ethylene slurry polymerisation process.

It is further an aim of the invention to decrease the risk of swelling in an ethylene slurry polymerisation process.

It is still another aim of the invention to increase the productivity of catalysts in ethylene slurry polymerisations.

Furthermore, it is an aim of the invention to increase the melt potential of polyethylenes produced in slurry reactors.

It is an additional aim of the invention to increase the efficiency of hexene incorporation into ethylene copolymers produced in slurry reactors.

Further to these aims, it is also an aim of the invention to increase the settling efficiency and decantation of the product slurry.

At least one of these aims is fulfilled by the current invention.

SUMMARY OF THE INVENTION

The invention is a method for ethylene slurry polymerisations in a loop reactor wherein the polymerisation temperature is maintained below the swelling temperature, characterised in that the swelling temperature is calculated as a function of the co-monomer concentration and the polyethylene weight average molecular weight.

BRIEF DESCRIPTION OF THE DRAWINGS

The drawing shows a number of functions showing swelling temperatures (y-axis in ° C.) as a function of co-monomer concentration (x-axis in % by weight) for chromium-catalysed and metallocene-catalysed ethylene polymerizations. Chromium-catalysed polymerisations are indicated using blackened symbols and metallocene-catalysed polymerisations are indicated using grey outlined symbols.

DETAILED DESCRIPTION OF THE INVENTION

The ethylene polymerisation according to the invention is carried out in slurry conditions, preferably in a loop reactor, more preferably in a liquid full loop reactor. The method of the invention is also suitable for one or more loop reactors connected to each other in series. If two serially connected loop reactors are used for the polymerisation, then the system is referred to herein as a double loop reactor.

As used herein, the term "polymerisation slurry" or "polymer slurry" means substantially a multi-phase composition including polymer solid particles and a liquid phase, the liquid phase being the continuous phase. The solids include catalyst and polymerised olefin, i.e. polyethylene. The liquids include an inert diluent, such as isobutane, with dissolved ethylene monomer and optionally one or more co-monomers, such as hexene, molecular weight control agents, such as hydrogen, antistatic agents, antifouling agents, scavengers, and other process additives.

Suitable inert diluents (as opposed to solvents or monomers) are well known in the art and include hydrocarbons, which are inert or at least essentially inert and liquid under polymerisation conditions. These hydrocarbons may comprise but are not limited to aliphatic, cycloaliphatic and aromatic hydrocarbons, or halogenated derivatives of such hydrocarbons. The preferred hydrocarbons are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting examples of possible diluents are propane, n-butane, isobutane, n-pentane, isopentane, neopentane, n-hexane, isohexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. Preferably, the diluent is isobutane.

According to the present invention the term "catalyst" is defined herein as a substance that causes a change in the rate of a polymerisation reaction without itself being consumed in the reaction. According to a preferred embodiment said catalyst is a single-site catalyst or a chromium-based catalyst. If more than one loop reactor connected to each other in series are used, then each reactor may comprise a different catalyst and even different catalyst types.

With the term "single-site catalyst" it is meant a metallocene or constrained geometry catalyst.

Preferably the single-site catalyst is a metallocene catalyst. A metallocene catalyst component is described as a transition metal complex consisting of metal atoms bonded to one or two ligands. In a preferred embodiment, the metallocene catalyst has a general formula MX, wherein M is a metal group 4 of the Periodic Table and wherein X is a ligand composed of one or two groups of cyclopentadienyl (Cp), indenyl, fluorenyl or their derivatives. More preferably, the metallocene catalyst component is ethylene-bis-tetrahydroindenyl zirconium dichloride or bis-(n-butyl-cyclopentadienyl)zirconium dichloride or dimethylsilylene-bis(2-methyl-4-phenyl-indenyl)zirconium dichloride. The most preferred metallocene component is ethylene-bis-tetrahydroindenyl zirconium dichloride. Use of metallocene catalysts in the polymerisation of olefins has various advantages. Metallocene catalysts are capable of preparing polymers with enhanced physical properties in comparison with other catalysts. The key to metallocenes is the structure of the complex. The structure and geometry of the metallocene can be adapted to the specific need of the producer depending on the desired polymer. Metallocenes comprise a single metal site, which allows for more control over co-monomer incorporation i.e. extremely regular distributions of short chain branching and narrow molecular weight distributions.

The metallocene catalysts are generally provided on a solid support. The support should be an inert solid, which is chemically unreactive with any of the components of the conventional metallocene catalyst. The support is preferably a silica compound.

The term "chromium catalysts" refers to catalysts obtained by deposition of chromium oxide on a support, e.g. silica or aluminium support. Illustrative examples of chromium catalysts comprise but are not limited to $CrSiO_2$ or $CrAl_2O_3$.

An activating agent may also be added to the reaction medium. The term "activating agent" as used herein is defined as a compound that can be used in conjunction with a catalyst in order to improve its activity and its availability in a polymerisation reaction. Such activating agents may include organometallic compounds, preferably selected from aluminoxane or boron-containing complexes. The most preferred activating agent is methylaluminoxane (MAO). The catalyst component is preferably supported on a silica support impregnated with MAO. Alternatively a fluorinated activating support, as described in EP-A-1 709 091 can be used as activating agent thereby suppressing the need for MAO.

Preferably, organometallic compounds of periodic groups I to III are used as co-catalyst according to the present invention. In a particularly preferred embodiment, said co-catalyst is a catalyst suitable for being used in conjunction with a metallocene catalyst and is an organoaluminium compound, being optionally halogenated, having a general formula $AIR_3$ or $AIR_2Y$, wherein R is an alkyl having 1-16 carbon atoms and R may be the same or different and wherein Y is hydrogen or a halogen. Examples of co-catalysts comprise but are not limited to trimethyl aluminium, triethyl aluminium, di-isobutyl aluminium hydride, tri-isobutyl aluminium, tri-hexyl aluminium, diethyl aluminium chloride, or diethyl aluminium ethoxide. A particularly preferred co-catalyst for use in the present invention is tri-isobutyl aluminium.

The co-monomers of the invention may comprise, but are not limited to, any aliphatic alpha-olefin comprising from 3 to 20 carbon atoms. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. Preferably the co-monomer is hexene. The amount of co-monomer, i.e. the co-monomer concentration used, depends on the desired density of the final polyethylene end product. The lower the desired density, the more co-monomer that must be incorporated into the polyethylene chain, thus the higher the concentration of co-monomer in the reaction medium.

In order to regulate the weight average molecular weight (MW) of the polyethylene, MW regulators can be optionally added to the reaction medium. Hydrogen is the most often used for this purpose. The more hydrogen that is added i.e. the higher the hydrogen concentration in the reactor, the shorter and lighter the polymer chains will be.

The polymerisation reaction can be carried out at temperatures of from 50 to 120° C., preferably at temperatures of from 70 to 115° C., more preferably at temperatures of from 80 to 110° C., and at pressures of from 20 to 100 bars, preferably at pressures of from 30 to 50 bars, more preferably at pressures of 37 to 45 bars.

The polymerisation temperature within the reactor is dependent on the desired end product. Generally, the higher the temperature, the more productive the catalyst will be. However, on the other hand, the higher the temperature, the higher the risk of swelling will be. As a general rule, it can be said that the higher the desired density of the final polyethylene, i.e. the lower the co-monomer concentration in the reaction medium, the higher the polymerisation temperature in the reactor can be maintained without the risk of swelling.

However, for each ethylene slurry polymerisation, at a particular temperature, swelling will be inevitable. This is called the swelling temperature. Swelling is a phenomenon that occurs when diluent, e.g. isobutane, enters the polymer fluff and dissolves low molecular weight polymers. Co-monomer, e.g. hexene, if present, is an even better solvent for low molecular weight polymers. Hence co-polymerisations suffer from a higher risk of swelling than homo-polymerisations. Swelling is also the result of the absorption of diluent and comonomer into the polymer grains. As a result, the polymer slurry becomes more viscous, which perturbs the flow in the reactor and may even lead to blockage of the reactor. Therefore, temperature and slurry densities must be well controlled in order to avoid the solubility of the lighter polymer fractions in the diluent and/or co-monomer. Solubility increases with increasing co-monomer concentration and with increasing temperature.

Swelling temperature is defined as the temperature at which swelling occurs i.e. when diluent and, if present, co-monomer enter the polymer fluff and/or when diluent and, if present, co-monomer are absorbed into the polymer grains.

Classical studies predict and determine the swelling temperature from a swelling curve, which is simply the linear relationship of swelling temperature and polyethylene density.

However, a more accurate prediction of swelling temperature is required in order to optimise the polymerisation temperature.

It has been found that swelling temperature in general depends on the following:
 fluff density: the lower the density, the lower the swelling temperature
 co-monomer concentration: the higher the concentration, the lower the swelling temperature
 number average molecular weight (Mn): the lower the molecular weight, the higher the risk of swelling
 molecular weight distribution (MWD): the narrower the MWD, the higher the risk of swelling, in particular swelling without warning, as is the case during metallocene-catalysed polymerisations
 solids content in the reactor: the higher the solids content, the higher the risk of swelling Thus a method for determining a swelling curve more accurately has been developed to take at least these factors into account. A more accurate swelling temperature can then be predicted using the swelling curve.

Fluff density can be taken into account by incorporating the co-monomer concentration in the calculations for obtaining the more accurate swelling curve, since co-monomer concentration and fluff density are directly related.

Molecular weight can be taken into account by incorporating the swelling temperatures of the heaviest and lightest polyethylenes to re-adjust the swelling curve.

In the case of metallocene-catalysed polyethylenes an additional empirical factor can be included in the calculations to take into account the narrower MWD.

The effect of the solid content on the other hand is difficult to evaluate. In theory, the higher the level of solids, the lower the diluent volume and the less heat transferred to the jacketed walls of the reactor. However, calibration is different from one reactor to another. Preferably, the level of solids is fixed to an approximate value for each reactor. This surprisingly provides good approximation of the effect of the solid content on the swelling temperature.

Co-monomer concentration in the reactor can be determined by studying the co-monomer off-gas from the reactor i.e. the co-monomer concentration in the diluent. It is preferable to take measurements of the co-monomer off-gas itself, rather than the hexene/ethylene off-gas ratio, because resins produced at different ethylene off-gas concentrations and different hexene off-gas concentrations may still have equivalent hexene/ethylene off-gas ratios. The ethylene concentration in the reactor can be determined from the ethylene off-gas i.e. the monomer concentration in the diluent.

The improved swelling curve to predict more accurately swelling temperatures $T_{s\text{-}final}$ for each chromium-based slurry polymerisation can be obtained according to the following generalised method:
 a). Set the solid content to an appropriate fixed level e.g. 44% depending on the reactor
 b). For several chromium-based catalysed resins, preferably over of a broad range of different densities, determine the actually measured i.e. empirically observed swelling temperatures $T_{s\text{-}observed}$ in terms of co-monomer concentration (i.e. co-monomer off-gas).
 c). Swelling curve in terms of co-monomer concentration: Using the obtained $T_{s\text{-}observed}$ determine a function y(x) where y=swelling temperature $T_s$ and x=co-monomer off-gas concentration.
 d). Swelling curve in terms of Mn: Determine a function v(w) having a linear relationship where v=delta swelling temperature $T_{s\text{-}delta}$ and w=MW of the polyethylene. $T_{s\text{-}delta}$ is the difference between $T_{s\text{-}observed}$ and $T_s$ of the swelling curve y(x). Preferably, the linear relationship (i.e. the function v(w)) is set up by using the two resins having the highest and lowest $T_{s\text{-}observed}$ respectively, i.e. resins having the highest and lowest Mn.
 e). Obtain the new swelling curve Z(x,w) from the sum of y(x) and v(w), where Z=swelling temperature $T_{s\text{-}final}$.

The polymerisation temperature can thus be optimised for every chromium-catalysed polyethylene produced in that reactor. Preferably, the polymerisation temperature is maintained 1 to 2° C. below the predetermined swelling temperature $T_{s\text{-}final}$, more preferably 1 to 1.5° C., most preferably about 1.5° C.

It has been found, that a more accurate swelling curve can also be obtained for metalloce-catalysed ethylene polymerisations to predict corresponding swelling temperatures $T_{s\text{-}final\ met}$. The swelling curve for metallocene-catalysed polyethylene can be obtained by extrapolation from the curve of the chromium-based catalysed polyethylene. Preferably, the metallocene-catalysed polymerisation is carried out in a similar reactor, more preferably in the same reactor.
 a). Measure a single swelling temperature $T_{s\text{-}observed\ met}$ for a metallocene-catalysed polymerisation process, preferably with a solid content similar to that fixed for the chromium-catalysed polymerisations.
 b). Swelling curve in terms of co-monomer concentration: This can be obtained by determining a function y'(x') such that its curve is parallel to the chromium-catalysed swelling curve and such that it goes through the $T_{s\text{-}observed\ met}$ of step 1, where y'=swelling temperature of metallocene-catalysed polymerisation $T_{s\text{-}met}$ and x'=co-monomer off-gas concentration of metallocene-catalysed polymerisation.
 c). Swelling curve in terms of Mn: Use the same linear function v(w) as used in the chromium-based polymerisations for the metallocene polymerisations.
 d). Effect of MWD: However, since metallocene-catalysed polyethylene have a narrower MWD, multiply v(w) with a factor f such that the final function Z'(x',w) being a sum of y'(x') and v(w), still fits $T_{s\text{-}observed\ met}$ of step 1, where Z'=swelling temperature $T_{s\text{-}final\ met}$.

The polymerisation temperature can thus be optimised for every metallocene-catalysed polyethylene produced in that reactor. Preferably, the polymerisation temperature is maintained 1 to 2° C. below the predetermined swelling temperature $T_{s\text{-}final\ met}$, more preferably 1 to 1.5° C., most preferably about 1.5° C.

The polymers produced according to the method of this invention exhibit decreased risk of swelling in the loop reactor during the slurry polymerisation. Decreased polymer swelling is advantageous because the loop reactor is less susceptible to fouling during the slurry polymerisation process: a polymer with low swell during slurry polymerisation usually has a desirable high bulk density; and polymer productivity, expressed as grams of polymer produced per gram of catalyst (g/g), can be increased. The ethylene polymerisation process and in particular the temperature of polymerisation is thus optimised.

The following non-limiting example illustrates the present invention.

EXAMPLE

A classical and empirical "swelling curve" (T° versus density) for chromium-catalysed slurry polymerisations was fine-tuned using additional data regarding co-monomer concentrations in the reactor, Mn and MWD. It was then used to extrapolate a curve for metallocene-catalysed slurry polymerisations.

The polymerisation was carried out under a pressure of from 40 to 50 bar and in the presence of hexene (C6) comonomer and isobutane (IC4) diluent in a double loop reactor. Hydrogen was used to control the MW of the polyethylenes and the C6 was used to control the density of the polyethylene.

As mentioned before, it is very difficult to evaluate the influence of solids content on swelling. Especially since calibration is different from one reactor to another and local swelling is dependant on the presence of a by-pass system. For this example, the solids level was fixed to 44% for all the resins produced in the loop reactors.

The example was performed according to the following steps to obtain in the first instance an accurate swelling curve for chromium-catalysed (Cr) polymerisations:
 a. Data was collected: HLMI, MI2, density, hexene off-gas (C6 OG), ethylene off-gas (C2 OG), actual swelling temperatures $T_{s\text{-}observed}$ for chromium grades of difference densities, GPC data for determining MWD, Mn.
 b. Swelling curve in terms of hexene concentration: The swelling curve for Cr resins as a function of the hexene concentration in the reactor instead of the resin density was obtained using $T_{s\text{-}observed}$ of several chromium catalysed polymersations. C6 OG, i.e. hexene concentration in IC4, was used to represent the hexene concentration.
 c. The annexed draw shows the calculated Cr swelling curve (see the drawing; black curve with black diamonds ♦), which takes into account the C6 OG. Swelling temperature equation for the function was determined as:

$$y = -0.095x^3 + 1.2712x^2 - 6.2093x + 106.64$$

where y=swelling temperature $T_s$ and x=C6 OG.

d. Swelling curve in terms of Mn: Swelling temperatures were evaluated for the chromium-based resins that have the lowest and highest swelling temperatures $T_{s-observed}$ and Mn: swelling the temperature for the resin with the highest Mn is globally 4° C. above the swelling curve and 2° C. below for the resin with the lowest Mn (see the drawing: large black ○). Thus, a linearly law is calculated taking into account the swelling temperature difference (4 and −2° C.) and the resin Mn (25 & 15 KDa):

$$v=6.27\cdot10^{-5}w-16.7$$

where v=delta swelling temperature $T_{s-delta}$ and w=Mn, which can be obtained from GPC data.

e. The sum of the two laws resulted in the new swelling curve for chromium-based slurry polymerisations named here Z(x,w) (see the drawing; black squares ■) which takes into account both the hexene concentration and the resin's Mn.

$$Z=(-0.095x^3+1.2712x^2-6.2093x+106.64)+(6.27*10^{-5}w-16.17)$$

where $Z=T_{s-final}$, x=C6 OG

It can be seen in the drawing that some resins are produced already close to this more accurate swelling curve. Previously used reactor temperatures $T_{reaction}$ based on the old swelling curve are shown as black triangles ▲. Others show room for optimisation of the reaction temperature. Future polymerisations were then maintained 1.5° C. below the swelling temperature as calculated according to the invention. These optimised polymerisations were just as stable, despite the higher reactor temperatures. The risk of swelling was dramatically decreased. Thus productivity of the catalyst was much higher and the overall gain obtainable from this invention was substantial. Hexene incorporation into the ethylene copolymer was improved and settling efficiency in the settling legs was increased. Furthermore, the Cr-based polyethylenes produced according to the invention showed higher melt potential.

For the metallocene-catalysed resins, the chromium-based swelling curve can be extrapolated according to the following example:

a. Data was collected (from the first reactor in the case of bimodal grades): HLMI, MI2, density, hexene off-gas (C6 OG), ethylene off-gas (C2 OG), swelling temperature for a single metallocene-catalysed resin $T_{s-observed\,met}$, GPC data for determining MWD, Mn.

b. Swelling has been observed in a metallocene-based resin in the loop reactor at 4% hexene and at 90° C. ($T_{s-observed\,met}$) (see the drawing; small grey circle ○). An equivalent of the chromium-catalysed resin swelling curve can be drawn parallel to the Chromium curve through $T_{s-observed\,met}$ (see the drawing: dashed grey curve)describable as:

$$y'=-0.095x'^3+1.2712x'^2-6.2093x'+100.54$$

where y'=swelling temperature $T_{s\,met}$ and x'=C6 OG c. As carried out for the Cr resins, the linear relationship between $T_{s-delta}$ and Mn ($v=6.27*10^{-5}w-16.7$) has been implemented in the calculations for the metallocene resins. Mn and MI2 are correlated according to the following equation:

$$w=31875*m^{-0.2163}$$

where m=MI2

This law results in considerably lower swelling temperatures (due to the much lower Mn values for metallocene resins) and a factor f has to be included in order to take into account the narrower MWD of these resins. In order to fit this curve with the empirical data of the metallocene-based resin $T_{s-observed\,met}$, this factor has been fixed to f=0.45.

The final metallocene swelling temperature curve is shown in the annexed drawing (grey squares □):

$$Z=(-0.095x^3+1.2712x^2-6.2093x+100.54)+(6.27*10^{-5}*31875*m^{-0.2163}-16.7)*0.45$$

where Z=Swelling $T_{s-final\,met}$, x=C6 OG, m=MI2

In the drawing, it can be observed that some resins are produced already close to this calculated swelling curve. Previously used reactor temperatures $T_{reaction-met}$ based on the old swelling curve are shown as are shown as grey triangles. Most show room for optimisation of the reaction temperature. Future polymerisations were maintained 1.5° C. below the swelling temperature as calculated according to the invention. These polymerisations were stable, despite the higher reactor temperatures. The risk of swelling was dramatically decreased. Thus productivity of the catalyst was much higher and the overall gain obtainable from this invention was substantial. Hexene incorporation into the ethylene copolymer was improved due to the higher reaction temperatures. Decantation of the slurry and settling efficiency in the settling legs was also improved.

Thus the maximal reactor temperature (at 44% solids) (with a safety temperature gap of about 1.5° C.) has been determined for the following metallocene resins:

| | |
|---|---|
| M1 | 93.0° C. instead of previous reactor temperature 85° C. |
| M2 | 97.5° C. instead of previous reactor temperature 88° C. |
| M3 | 94.5° C. instead of previous reactor temperature 88° C. |
| M4 | 96.5° C. instead of previous reactor temperature 90° C. |
| M5 | 89.0° C. instead of previous reactor temperature 87° C. |
| M8 | 93.0° C. instead of previous reactor temperature 90° C. |

TABLE 1

| | C6 OG/ wt % | Mn/ Da | Swelling temperature calculated according to the invention/ ° C. |
|---|---|---|---|
| Chromium-catalysed polymerisations | | | |
| C1 | 0.011 | 16921 | 105.3 |
| C2 | 0.011 | 16493 | 105.0 |
| C3 | 0.012 | 17619 | 105.8 |
| C4 | 0.013 | 18378 | 106.3 |
| C5 | 0.016 | 17767 | 105.9 |
| C6 | 0.042 | 24446 | 110.4 |
| C7 | 0.17 | 18017 | 105.1 |
| C8 | 0.284 | 18345 | 104.7 |
| C9 | 0.328 | 19299 | 105.1 |
| C10 | 0.766 | 18323 | 102.3 |
| C11 | 1.584 | 16245 | 97.9 |
| C12 | 2.624 | 16678 | 95.9 |
| C13 | 2.904 | 15432 | 94.7 |
| C14 | 5.540 | 15010 | 92.5 |
| Metallocene-catalysed polymerisations | | | |
| M1 | 4.2 | 32095 | 94.7 |
| M2 | 2.925 | 39660 | 99.2 |
| M3 | 3.575 | 34245 | 96.1 |
| M4 | 1.95 | 33061 | 97.9 |
| M5 | 3.315 | 21983 | 90.7 |
| M6 | 0.26 | 25770 | 101.0 |
| M7 | 0.13 | 19165 | 98.6 |
| M8 | 1.5 | 22700 | 94.3 |
| M9 | 0.41 | 30400 | 102.3 |

The invention claimed is:

1. A method for ethylene slurry polymerisations in a loop reactor comprising:
    introducing ethylene monomer, diluent, catalyst, co-monomer, and hydrogen into a loop reactor to form polyethylene, wherein a polymerisation temperature is maintained below a swelling temperature, wherein the swelling ,temperature ($T_{s\text{-}final}$) is calculated as a function of co-monomer concentration and a number average molecular weight (Mn) of the polyethylene.

2. The method of claim 1, wherein the loop reactor is the first loop in a double loop, reactor comprising two loop reactors connected to each other in series.

3. The method of claim 1, wherein the polymierisation is carried out in the presence of one or more of the following catalysts:
    chromium-based catalyst, or single-site catalyst.

4. The method of claim 3, wherein a factor for the molecular weight distribution is included in the calculation of the swelling temperature $T_{s\text{-}final}$.

5. The method of claim 1, wherein the polymerisation is carried out in the presence of co-monomer selected from one or more alpha-olefins.

6. The method of claim 1, wherein the diluent is a hydrocarbon, which is inert under the polymerisation conditions.

7. The method of claim 1, wherein the polymerisation temperature is maintained 1 to 2° C. below the calculated swelling temperature.

8. The method of claim 1, wherein the swelling temperature $T_{s\text{-}final}$ for a chromium-catalysed polymerisation is calculated by determining a swelling curve comprising:
    assuming an appropriately fixed solid content level;
    determining the swelling curve in terms of the co-monomer concentration by setting up a function y(x) where y is the swelling temperature $T_S$, and x is the co-monomer off-gas concentration using measured swelling temperatures $T_{s\text{-}observed}$ of resins having different densities;
    determining the swelling curve in terms of the number average molecular weight (Mn) of polyethylene by setting up a linear function v(w) using at least two $T_{s\text{-}observed}$ from the highest and lowest Mn resin, respectively, where v is the delta swelling temperature $T_{s\text{-}delta}$, which is the difference between $T_{s\text{-}observed}$ and $T_S$ of the swelling curve y(x), and w is the number average molecular weight Mn of polyethylene; and
    obtaining the new swelling curve Z(x,w) from the sum of y(x) and v(w), where Z is the swelling temperature $T_{s\text{-}final}$.

9. The method of claim 8 further comprising:
    measuring a single swelling temperature $T_{s\text{-}observed\ met}$ for a metallocene-catalysed polymierisation process;
    determining the swelling curve in terms of co-monomer concentration by setting up a function y'(x') such that its curve is parallel to the chromium-catalysed swelling curve and such that it goes through $T_{s\text{-}observed}$ met of step a), where y' is the swelling temperature $T_{s\text{-}met}$ of the metallocene-catalysed polymerisation and x' is the co-monomer off-gas concentration of the metallocene-catalysed polymerisation;
    determining the swelling curve in terms of the number average molecular weight (Mn) by using the same linear function v(w) as used in the chromium-based polymerisations for the metallocene polymerisations; and
    incorporating the effect of the molecular weight distribution by multiplying v(w) with a factor f such that the final function Z'(x',w) being a sum of y'(x') and v(w), still fits $T_{s\text{-}observed\ met}$ of step a, where $Z'=T_{s\text{-}final\ met}$ of the metallocene-catalysed polymerisation.

UNITED STATES PATENT AND TRADEMARK OFFICE
CERTIFICATE OF CORRECTION

| | | |
|---|---|---|
| PATENT NO. | : 8,106,136 B2 | Page 1 of 1 |
| APPLICATION NO. | : 12/741237 | |
| DATED | : January 31, 2012 | |
| INVENTOR(S) | : Daniel Siraux | |

It is certified that error appears in the above-identified patent and that said Letters Patent is hereby corrected as shown below:

Column 8, Line 60, the word "draw", should be --drawing--.

Column 9, Line 14, the words "sum of the", should be --sum of these--.

Claim 1, Column 11, Line 8, delete "," between the words "swelling" and "temperature".

Claim 2, Column 11, Line 12, delete "," between the words "loop" and "reactor".

Signed and Sealed this
Twenty-seventh Day of March, 2012

David J. Kappos
*Director of the United States Patent and Trademark Office*